US011878475B2

(12) United States Patent
Dry et al.

(10) Patent No.: US 11,878,475 B2
(45) Date of Patent: *Jan. 23, 2024

(54) AGILE ROBOTIC HEADLAMP ASSEMBLY WITH SONIC FASTENING AND INJECTED LENS ADHESIVE

(71) Applicant: Ford Global Technologies, LLC, Dearborn, MI (US)

(72) Inventors: Alan George Dry, Grosse Pointe Woods, MI (US); David A. Brown, Plymouth, MI (US); Robert William Miller, Inkster, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/964,174

(22) Filed: Oct. 12, 2022

(65) Prior Publication Data

US 2023/0029487 A1 Feb. 2, 2023

Related U.S. Application Data

(63) Continuation of application No. 17/039,598, filed on Sep. 30, 2020, now Pat. No. 11,498,285.

(51) Int. Cl.
*B23P 19/04* (2006.01)
*B23P 21/00* (2006.01)
(Continued)

(52) U.S. Cl.
CPC .............. *B29C 65/72* (2013.01); *B23K 20/10* (2013.01); *B23P 19/04* (2013.01); *B23P 21/002* (2013.01);
(Continued)

(58) Field of Classification Search
CPC ......... Y10T 29/49904; Y10T 29/49829; Y10T 29/49831; Y10T 29/49968; Y10T 29/4997;
(Continued)

(56) References Cited

U.S. PATENT DOCUMENTS 5,239,739 A * 8/1993 Akeel ................... B62D 65/02
29/430
5,320,403 A * 6/1994 Kazyak ............... B62D 23/005
296/205
(Continued)

FOREIGN PATENT DOCUMENTS

CN 110625946 A * 12/2019 ............. B29C 65/08
WO WO-2017034566 A1 * 3/2017 ............. B21D 28/24

*Primary Examiner* — Jermie E Cozart
(74) *Attorney, Agent, or Firm* — Burris Law, PLLC

(57) ABSTRACT

A system and method for assembling a plurality of components into an assembly is provided. The system includes an assembling robot and an adhesive dispensing robot. The assembling robot is configured to attach a first sub-assembly to a second sub-assembly. The first sub-assembly includes at least one of the plurality of components, and the second sub-assembly includes remaining ones of the plurality of components. The adhesive dispensing robot is configured to apply an adhesive between the first sub-assembly and the second sub-assembly, after the first sub-assembly is attached to the second sub-assembly, to bond the first sub-assembly to the second sub-assembly.

19 Claims, 8 Drawing Sheets

(51) Int. Cl.
| | |
|---|---|
| B23K 20/10 | (2006.01) |
| B29C 65/72 | (2006.01) |
| B25J 11/00 | (2006.01) |
| B29C 65/78 | (2006.01) |
| B29C 65/08 | (2006.01) |
| B29C 65/00 | (2006.01) |
| B29C 65/52 | (2006.01) |
| B25J 15/00 | (2006.01) |
| B29C 65/60 | (2006.01) |
| B29C 65/54 | (2006.01) |
| B29C 65/64 | (2006.01) |
| B23K 37/04 | (2006.01) |
| B23K 33/00 | (2006.01) |

(52) U.S. Cl.
CPC ........... B25J 11/005 (2013.01); B25J 15/008 (2013.01); B29C 65/08 (2013.01); B29C 65/52 (2013.01); B29C 65/7858 (2013.01); B29C 66/742 (2013.01); B23K 33/008 (2013.01); B23K 37/0461 (2013.01); B23P 21/004 (2013.01); B23P 21/006 (2013.01); *B23P 2700/50* (2013.01); *B29C 65/542* (2013.01); *B29C 65/606* (2013.01); *B29C 65/645* (2013.01); *Y10T 29/4997* (2015.01); *Y10T 29/49829* (2015.01); *Y10T 29/49831* (2015.01); *Y10T 29/49895* (2015.01); *Y10T 29/49901* (2015.01); *Y10T 29/49904* (2015.01); *Y10T 29/49968* (2015.01); *Y10T 29/5337* (2015.01); *Y10T 29/53417* (2015.01); *Y10T 29/53435* (2015.01)

(58) Field of Classification Search
CPC ....... B23P 19/04; B23P 21/002; B23P 21/006; B23P 2700/50; B23K 33/008; B23K 20/10; B23K 37/0461
See application file for complete search history.

(56) References Cited

U.S. PATENT DOCUMENTS

| | | | |
|---|---|---|---|
| 11,498,285 B2 * | 11/2022 | Dry | ........................ B29C 66/863 |
| 2019/0283824 A1 * | 9/2019 | Rawas | ................... B25J 9/0096 |

* cited by examiner

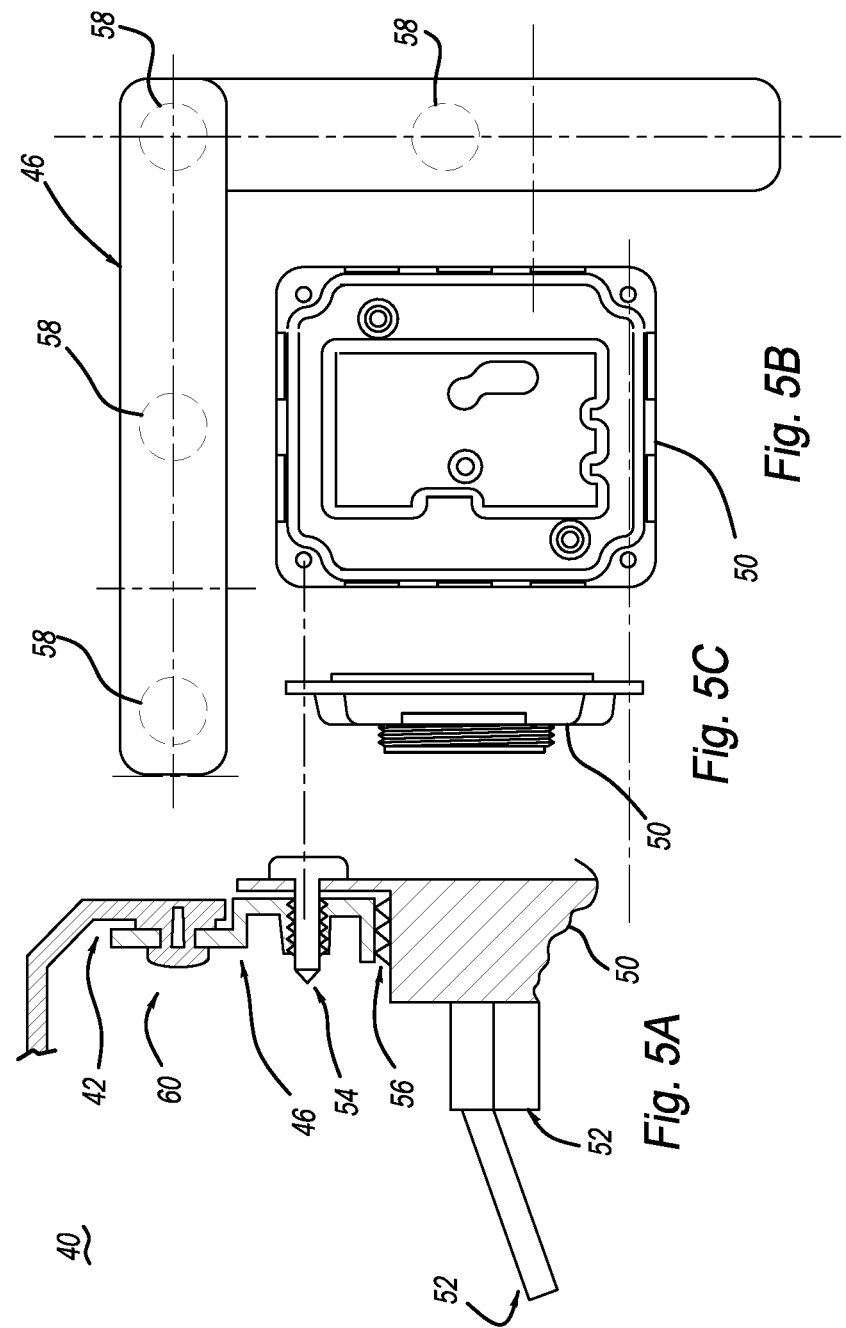

AGILE ROBOTIC HEADLAMP ASSEMBLY WITH SONIC FASTENING AND INJECTED LENS ADHESIVE

CROSS-REFERENCE TO RELATED APPLICATION

This application is a continuation of and claims the benefit of U.S. application Ser. No. 17/039,598, filed Sep. 30, 2020, and titled "AGILE ROBOTIC HEADLAMP ASSEMBLY WITH SONIC FASTENING AND INJECTED LENS ADHESIVE," the content of which is incorporated herein by reference in its entirety.

FIELD

The present disclosure relates to systems and methods for assembling components into an assembly, and more particularly to automated systems for joining dissimilar materials including plastic materials to form an assembly.

BACKGROUND

The statements in this section merely provide background information related to the present disclosure and may not constitute prior art.

Plastic components are frequently integrated into other manufactured components as a way to reduce costs and create lighter weight products. Heat staking, also known as thermoplastic staking, is a process of joining two dissimilar materials together, where a portion of the plastic components is melted by heating and reformed after cooling in order to retain or join the component parts together. This creates a solid, hardware-free bond that uses the plastic's inherent strength to keep the finished assembly together To connect a metal component to a plastic component by heat staking, the plastic is melted around an insert of the metal component. The metal component needs to be sufficiently heated before the metal component is pressed into the plastic component to melt the plastic around the metal component. It is time consuming to heat the metal component before the metal component is inserted into the plastic component and cool the bonding interface between the metal component and the plastic component.

The above-mentioned issues are addressed in the present disclosure.

SUMMARY

In one form of the present disclosure, a system for assembling a plurality of components into an assembly is provided. The system includes an assembling robot and an adhesive dispensing robot. The assembling robot is configured to attach a first sub-assembly to a second sub-assembly. The first sub-assembly includes at least one of the plurality of components, and the second sub-assembly includes remaining ones of the plurality of components. The adhesive dispensing robot is configured to apply an adhesive between the first sub-assembly and the second sub-assembly, after the first sub-assembly is attached to the second sub-assembly, to bond the first sub-assembly to the second sub-assembly.

In other features, the first sub-assembly includes some of the plurality of components. The system further includes at least one of a first transfer robot and a second transfer robot. The first transfer robot is configured to assemble the some of the plurality of components into the first sub-assembly at a first site. The second transfer robot is configured to assemble the remaining ones of the plurality of components into the second sub-assembly at a second site. The first transfer robot and the second transfer robot are configured to respectively transfer the first sub-assembly and the second sub-assembly from the first site and the second site to an installation site. At least one of the first site and the second site includes a tilting table.

The system further includes at least one of a first welding robot and a second welding robot. The first welding robot is configured to weld the some of the plurality of components into the first sub-assembly and the second welding robot is configured to weld the remaining ones of the plurality of components into the second sub-assembly. The first and second welding robots sonically weld the some and the remaining ones of the plurality of components into the first and second sub-assemblies, respectively. The first sub-assembly is a carrier assembly including a peripheral trench. The second sub-assembly is a lens assembly including a peripheral rib. The adhesive dispensing robot is configured to inject the adhesive into the peripheral trench after the peripheral rib is inserted into the peripheral trench.

In another form of the present disclosure, a method for assembling a plurality of components into an assembly is provided. The method includes: preparing a first sub-assembly and a second sub-assembly; attaching, by an assembling robot, the first sub-assembly to the second sub-assembly; and applying, by an adhesive dispensing robot, an adhesive between the first sub-assembly and the second sub-assembly, after the first sub-assembly is attached to the second sub-assembly, to bond the first sub-assembly to the second sub-assembly.

In other features, the method further includes: assembling, by a first transfer robot, the at least one of the plurality of components into the first sub-assembly at a first tilting table when the remaining ones of the plurality of components are assembled, by a second transfer robot, into the second sub-assembly at a second titling table; welding the remaining ones of the plurality of components into the second sub-assembly; transferring the first sub-assembly by a first transfer robot and the second sub-assembly by the second transfer robot to an installation table; attaching the first sub-assembly to the second sub-assembly on the installation table; assembling the some of the plurality of components into the first sub-assembly by sonic welding and assembling the remaining ones of the plurality of components into the second sub-assembly by sonic welding; sonically welding the first sub-assembly to the second sub-assembly by a welding robot. The adhesive is applied between the first sub-assembly and the second sub-assembly after the first sub-assembly and the second sub-assembly are transferred to the installation table.

In other features, the method further includes inserting a rib of the second sub-assembly into a trench of the first sub-assembly; and injecting the adhesive into the trench after the rib of the second sub-assembly is inserted into the trench of the first sub-assembly.

It should be noted that the features which are set out individually in the following description can be combined with each other in any technically advantageous manner and set out other variations of the present disclosure. The description additionally characterizes and specifies the present disclosure, in particular in connection with the figures.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 5A is a schematic cross-sectional view of a portion of the carrier assembly of FIG. 4;

FIG. 5B is a plan view of a sealing plate and a power unit installed to the carrier shell of the carrier assembly of FIG. 5A;

FIG. 5C is a side view of a power unit mounted to the carrier assembly of FIG. 5A;

Figure 1:
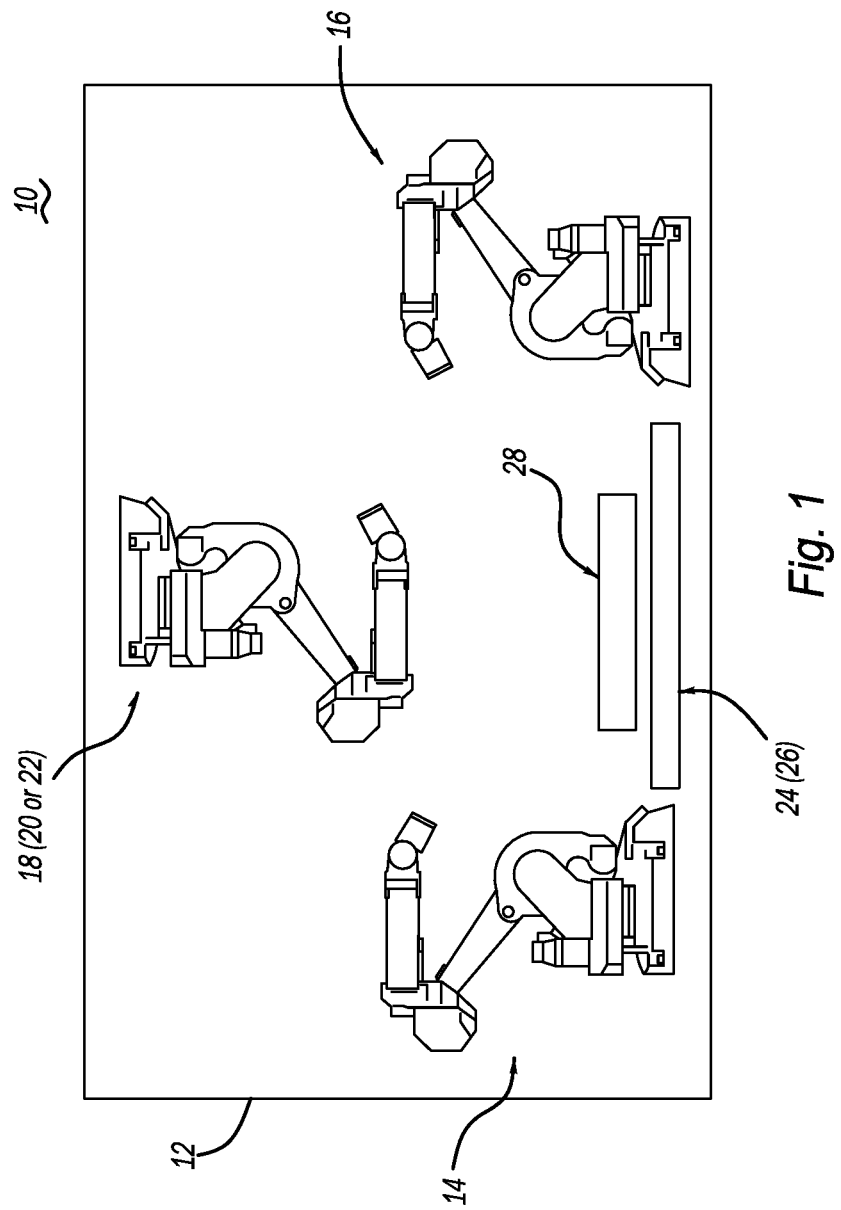
FIG. 1 is a schematic view of a system for assembling a plurality of components into an assembly constructed in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, a system 10 for assembling a plurality of components into an assembly includes a cell 12, a plurality of robots, and a plurality of tables disposed inside the cell 12. The plurality of components may be made of dissimilar materials and one or more of the plurality of components are made of thermoplastic materials. The plurality of robots include a first transfer robot 14, a second transfer robot 16, a first welding robot 18, a second welding robot 20, and an adhesive dispensing robot 22. The plurality of tables include a first tilting table 24 on which a first sub-assembly is assembled, a second tilting table 26 on which a second sub-assembly is assembled, and a fixed table 28 on which the first sub-assembly is installed to the second sub-assembly to form a final assembly. The first and second tilting tables 24 and 26, being able to rotate and tile at different angles, enable full access for the sonic fastening horns of the first and second welding robots 18, 20 and perpendicular staking by the first and second transfer robots 14, 16, which will be described in more detail below.

The plurality of robots 14, 16, 18, 20, 22 may each include a robotic arm and one or more end effecters removably mounted to the robotic arm to build a wide variety of products depending on needs. The first welding robot 18 and the second welding robot 20 are configured to use high-frequency vibrations that are transmitted through a pneumatic cylinder with an ultrasonic horn to provide sonic-welding. The rapid vibration generates heat that melts an insert of a plastic component to form an enlarged portion, thereby retaining the plastic component onto another component, such as a metallic component. In order to complete ultrasonic welding or insertion, an ultrasonic horn, an electronic power supply, an energy transducer, and timers are required to control vibration cycles. The end effecters for the first and second welding robots 18, 20 may be one of a bar horn, a catenoidal tapped horn, an ultrasonic blank welding tip, an ultrasonic spot-welding tip, an ultrasonic knurled tip, an ultrasonic rosette tip.

Figure 2:
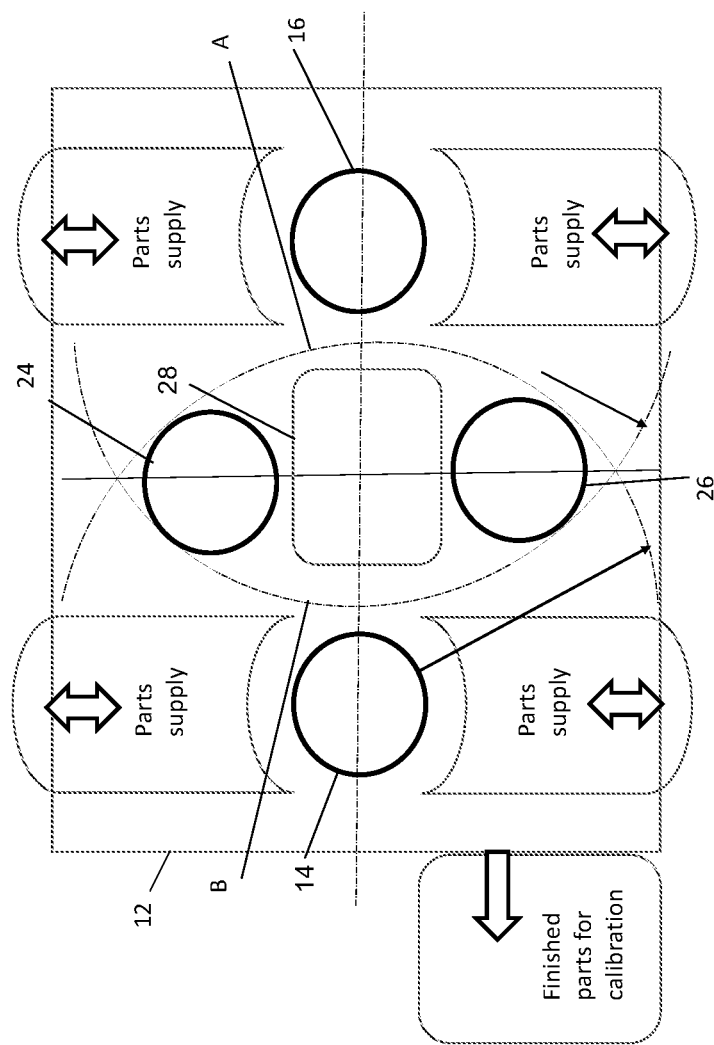
FIG. 2 is another schematic view of a system for assembling a plurality of components into an assembly constructed in accordance with the teachings of the present disclosure.

Referring to FIG. 2, as an example, the first tilting table 24, the second tilting table 26, and the fixed table 28 may be aligned with the fixed tables 28 disposed in the middle. The first transfer robot 14 and the second transfer robot 16 may be disposed on opposing sides of the plurality of tables. Each of the first transfer robot 14 and the second transfer robot 16 can transfer components (e.g., along curved paths A, B) to the first and second tilting tables 24, 26 for assembling. The components for forming a first sub-assembly are transferred to the first tilting table 24. The components for forming a second sub-assembly are transferred to the second tilting table 26.

Figure 3:
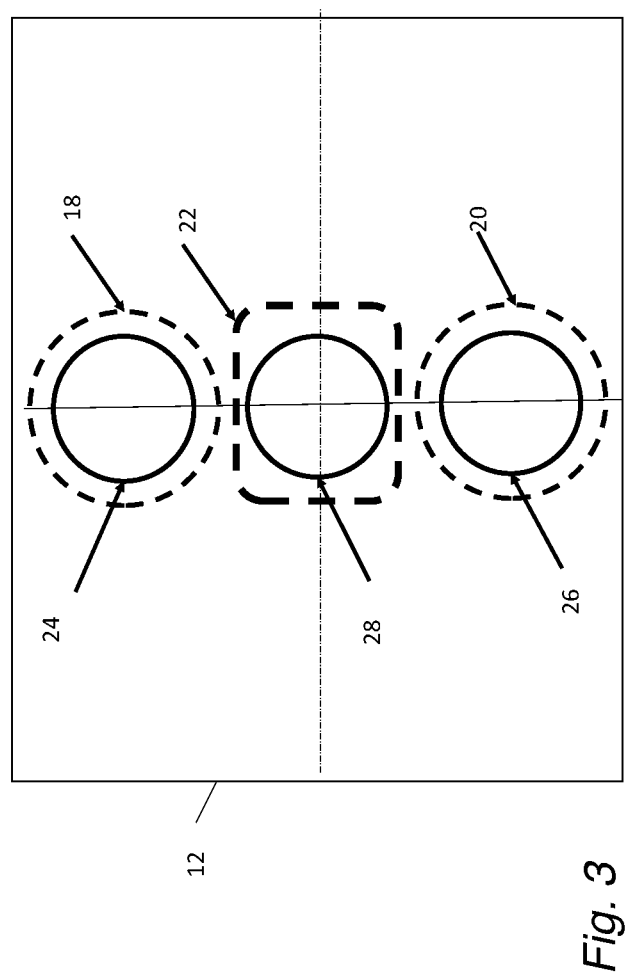
FIG. 3 is still another schematic view of a system for assembling a plurality of components into an assembly constructed in accordance with the teachings of the present disclosure.

Referring to FIG. 3, the first and second welding robots 18, 20 and the adhesive dispensing robot 22 may be disposed above the first tilting table 24, the second tilting table 26, and the fixed table 28, respectively. The first welding robot 18 is configured to sonically weld some of the components placed on the first tilting table 24 for forming the first sub-assembly. The second welding robot 20 is configured to sonically weld some of the components placed on the second tilting table 26 for forming the second sub-assembly.

The adhesive dispensing robot 22 is configured to inject an adhesive into a first sub-assembly being assembled on the first tilting table 24, and into a second sub-assembly being assembled on the second tilting table 26 depending on applications. After the first and second sub-assemblies are completely assembled on the first and second tilting tables 24 and 26, the first transfer robot 14 and the second transfer robot 16 transfer the first and second sub-assemblies to the fixed table 28 for a subsequent adhesive bonding process by the adhesive dispensing robot 22. After the first and second sub-assemblies are assembled, the final assembly is placed on a rack for curing prior to testing, such as a pressure testing.

Figure 4:
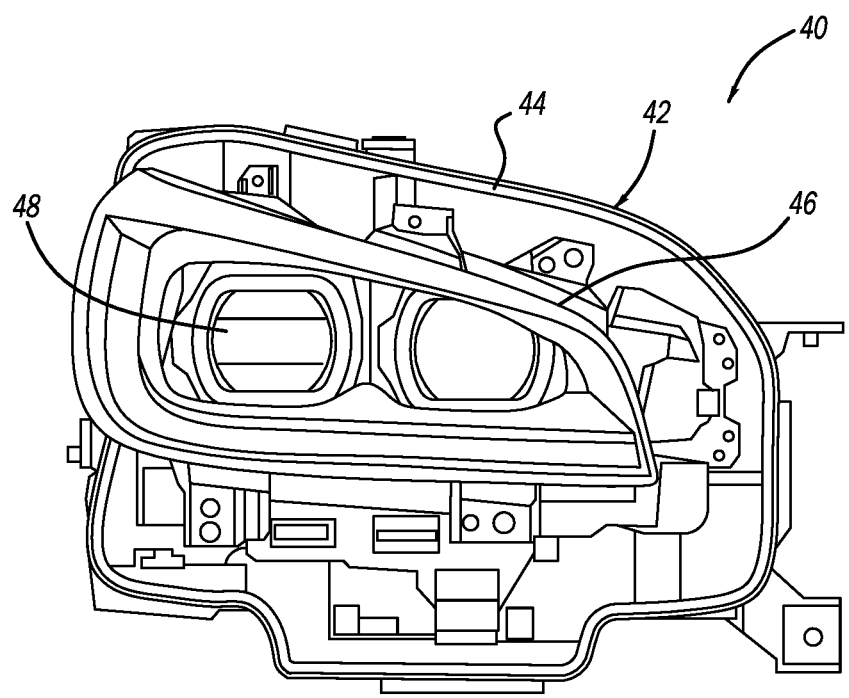
FIG. 4 is a perspective view of a carrier assembly assembled by a system for assembling a plurality of components into an assembly constructed in accordance with the teachings of the present disclosure.

Referring to FIG. 4, as an example, the assembly may be a headlamp assembly including a carrier assembly 40 as the first sub-assembly and a lens assembly 70 (shown in FIG. 7) as the second sub-assembly. The carrier assembly 40 includes a carrier shell 42 defining a trench 44 along the periphery of the carrier shell 42. The carrier assembly 40 further includes a plurality of components, such as a sealing plate 46, a lighting unit 48, a power unit 50, wire harnesses 52 (shown in FIGS. 5A-5C) mounted to the carrier shell 42.

Referring to FIGS. 5A to 5C, the power unit 50 may be mounted to the sealing plate 46 by screws 54. An adhesive 56 may be injected by the adhesive dispensing robot 22 into a space between the sealing plate 46 and the power unit 50. The sealing plate 46 defines a plurality of openings 58 for receiving stake portions 60 of the carrier shell 42.

Figure 6A:
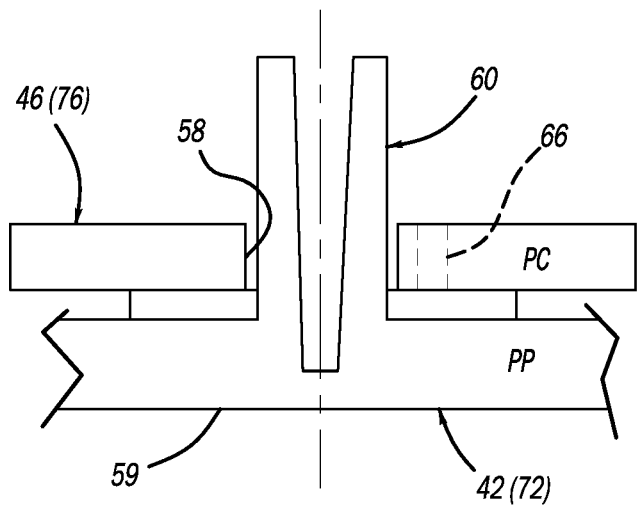
FIGS. 6A and 6B depict a method of assembling two components together by sonic-staking and adhesive bonding.
Figure 6B:
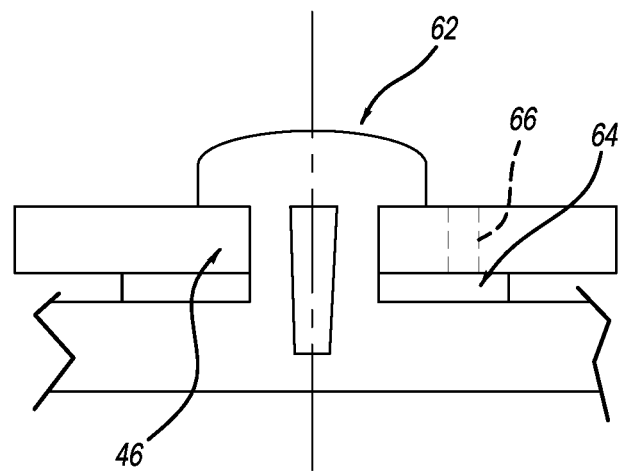

Referring to FIGS. 6A and 6B, the carrier shell 42 may include a body portion 59 and a plurality of stake portions 60 (only one is shown in FIGS. 6A and 6B) protruding from the body portion 59. The stake portions 60 are first inserted into openings 58 of the sealing plate 46 and are held in position by at least one of the first and second transfer robots 14 and 16 or by any locking feature formed on the sealing plate 46 or the carrier shell 42. Then, the first welding robot 24 sonically welds the stake portions 60 to form an enlarged portion, such as a rivet head 62. The adhesive dispensing robot 22 then injects an adhesive into a space 64 between the carrier shell 42 and the sealing plate 46 through one or more ports 66 to bond the sealing plate 46 to the carrier shell 42. The adhesive also forms a water seal or airtight seal between the carrier shell 42 and the sealing plate 46.

While not shown in the drawings, it is understood that a plurality of components may be installed to the sealing plate 46 or the carrier shell 42 by screws 54, by the sonic-staking method described in FIGS. 6A and 6B, and/or by any other conventional fastening means/methods to complete the carrier assembly 40.

Figure 7:
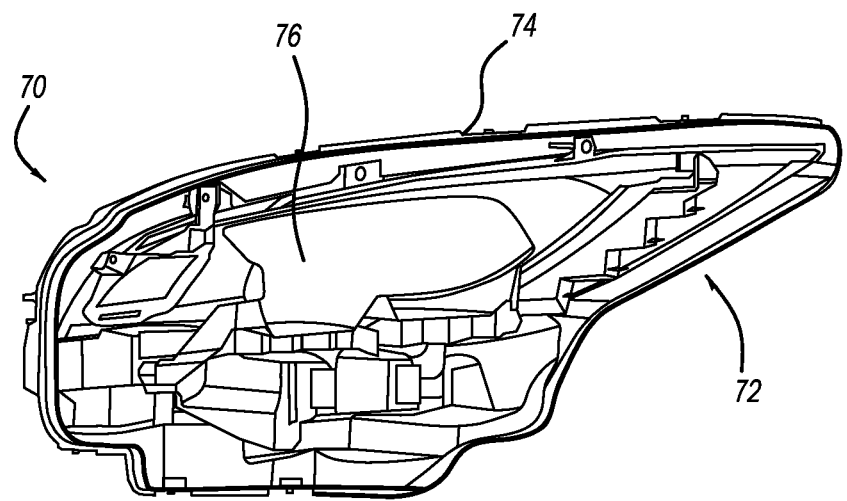
FIG. 7 is a perspective view of a lens assembly assembled by a system for assembling a plurality of components into an assembly constructed in accordance with the teachings of the present disclosure.

Referring to FIG. 7, the lens assembly 70 as the second sub-assembly for the headlamp assembly may include a frame 72 and a rib 74 along the periphery of the lens assembly 70. The lens assembly 70 further includes a plurality of components, such as a lens 76, mounted to the frame 72. Similarly, as shown in FIGS. 6A and 6B, the frame 72 may include a plurality of stake portions 60, and the lens 76 may include a plurality of openings 58 to allow the stake portions 60 of the frame 72 to be inserted. The second welding robot 26 sonically welds the stake portions 60 to form riveted heads 62 to fasten the frame 72 to the lens 76. Thereafter, the adhesive dispensing robot 22 may inject an adhesive between a space 64 between the frame 72 and the lens 76 to bond the lens 76 to the frame 72. Similarly, while not shown in figures, the lens assembly 70 may include a plurality of components that may be installed to the frame 72 by screws 54, by the sonic-staking method described in connection with FIGS. 6A and 6B, and/or by any conventional fastening means/methods to complete the lens assembly 70.

Referring to FIGS. 8A to 8D, after the carrier assembly 40 and the lens assembly 70 are completed, the carrier assembly 40 and the lens assembly 70 are transferred to the fixed table 28 for final installation. The lens assembly 70 is installed to the carrier assembly 40 by inserting the rib 74 of the lens assembly 70 into the trench 44 of the carrier assembly 40, followed by injecting an adhesive in the trench 44 to bond the carrier assembly 40 to the lens assembly 70.

Figure 8A:
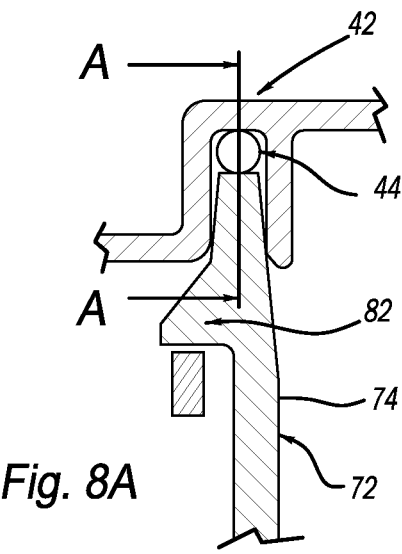
FIG. 8A is a cross-sectional view of a portion of a headlamp assembly, showing an interface between a trench of a carrier assembly and a rib of a lens assembly.

As shown in FIG. 8A, the rib 74 of the lens assembly 70 is inserted into the trench 44 of the carrier assembly 40 and kept in place relative to the carrier assembly 40 by a locking feature formed between the carrier assembly 40 and the lens assembly 70. As an example, the lens assembly 70 may include a protruding tab 82 to be clipped into a hole 84 in the carrier assembly 40.

Figure 8B:
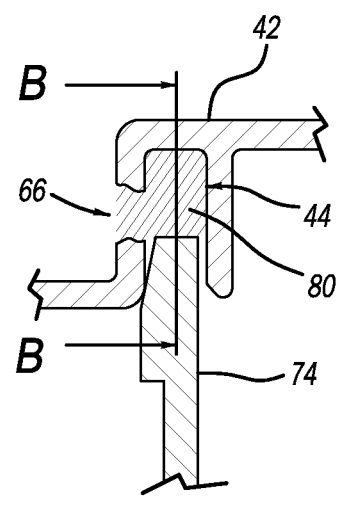
FIG. 8B is a cross-sectional view of a portion of a headlamp assembly, showing another interface between a trench of a carrier assembly and a rib of a lens assembly.
Figure 8C:
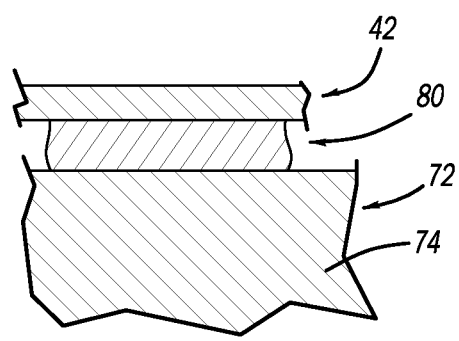
FIG. 8C is a cross-sectional view of a portion of a headlamp assembly, taken along line A-A of FIG. 8A.
Figure 8D:
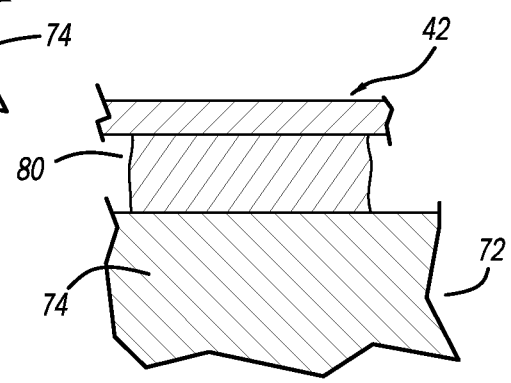
FIG. 8D is a cross-sectional view of a portion of a headlamp assembly, taken along line B-B of FIG. 8B.

As shown in FIG. 8B, thereafter, the adhesive dispensing robot 22 injects an adhesive 80 through at least one port 66 located in the carrier assembly 40 such that the adhesive may flow into the trench 44 along the periphery of the carrier assembly 40 to bond the carrier assembly 40 to the lens assembly 70, thereby completing the headlamp assembly.

Because the adhesive is injected into the trench 44 after the rib 74 is inserted into the trench 44, the carrier assembly 40 and the lens assembly 70 can be assembled in an orientation that the open end of the trench 44 faces down, as opposed to a conventional method where the open end of the trench has to face up to allow the adhesive to be applied and held inside the trench before the lens assembly is installed to the carrier assembly.

In the system of the present disclosure, the carrier assembly is assembled and welded on the first tilting table by the first transfer robot and the first welding robot, when the lens assembly is assembled and welded on the second tilting table by the second transfer robot and the second welding robot. The adhesive dispensing robot may inject an adhesive to the carrier assembly on the first tilting table and to the lens assembly on the second tilting table when needed during assembling of the carrier assembly and the lens assembly. After the carrier assembly and the lens assembly are completed, the carrier assembly and the lens assembly are transferred to the fixed table on which the carrier assembly and the lens assembly are assembled together to form a final headlamp assembly. All of the operations performed by the first and second transfer robots 14, 16, the first and second welding robots 18, 20, and the adhesive dispensing robot 22 occur inside the cell 12.

The system 10 includes a plurality of robots and tilting tables that assemble, attach and seal components of the headlamp assembly together by sonically forming thermoplastic rivet heads, followed by injecting sealant/adhesive for bonding. At least one of the robots sonically melts thermoplastic stake portions protruding from a first component and through a second component to form the thermoplastic rivet heads, thereby joining the two components together. At least one of the robots injects adhesive into one or more channel(s)/spaces between the two components to form a water or air tight seal between the two components. All operations occur inside the cell 12, thereby automating a full-scale headlamp production. Sonic-staking is one of the fastening methods used to install the various components to the sub-assemblies. Sonic staking does not require a molecular bond between the joined materials. Sonic staking is fast and imparts minimal heat to the surrounding surfaces and can individually press and hold parts into a tight assembly. Therefore, the carrier shell and the frame can be designed to have a single design of stake portions to facilitate installing a plurality of components onto the carrier shell and the frame to form the carrier assembly and the lens assembly.

The system and method of the present disclosure has the advantage of reducing manufacturing costs of the headlamp assembly. By using the system and the method according to the present disclosure, parts to be mounted to the carrier shell and the frame may be made by the most cost-efficient high production method such as high-pressure plastic injection molding (HPIM) with no changes to their existing surface finishes.

The robotic sonic fastening cell offers fast assembly as it only holds and fastens parts in place but does not create parts. The wiring harness will be fastened to the internal assembly. The harness will be connected to every electrical interface of components that affix to the carrier shell. The harness will be rigidized to enable its extremities to locate the stakes in the carrier shell. All components will be sonic staked to the shell internally. The electrical harness of lens and light aiming modules will have pigtails to allow later connection manually. The headlamps will be assembled using high quality, high volume production components, thereby eliminating semi-automated machines and operators and simplifying the design of parts and eliminate cumulative position errors.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A system for assembling a plurality of components into an assembly, comprising:
   a first transfer robot for assembling some of the plurality of components into a first sub-assembly in a cell;
   a second transfer robot for assembling remaining ones of the plurality of components into a second sub-assembly in the cell when the first transfer robot assembled the some of the plurality of components into the first sub-assembly in the cell;
   an assembling robot for attaching the first sub-assembly to the second sub-assembly; and
   an adhesive dispensing robot configured to apply an adhesive between the first sub-assembly and the second sub-assembly in the cell, after the first sub-assembly is attached to the second sub-assembly, to bond the first sub-assembly to the second sub-assembly.

2. The system according to claim 1, wherein the first transfer robot is configured to assemble the some of the plurality of components into the first sub-assembly at a first site in the cell, and the second transfer robot is configured to assemble the remaining ones of the plurality of components into the second sub-assembly at a second site in the cell.

3. The system according to claim 2, wherein the first transfer robot and the second transfer robot respectively transfer the first sub-assembly and the second sub-assembly from the first site and the second site to an installation site in the cell.

4. The system according to claim 3, wherein at least one of the first site and the second site includes a tilting table.

5. The system according to claim 2, further comprising at least one of a first welding robot and a second welding robot, wherein the first welding robot is configured to weld the some of the plurality of components into the first sub-assembly and the second welding robot is configured to weld the remaining ones of the plurality of components into the second sub-assembly.

6. The system according to claim 2, further comprising at least one of a first welding robot and a second welding robot, wherein the first welding robot is configured to sonically weld the some of the plurality of components into the first sub-assembly and the second welding robot is configured to sonically weld the remaining ones of the plurality of components into the second sub-assembly.

7. The system according to claim 1, wherein the first sub-assembly is a carrier assembly including a peripheral trench, and the second sub-assembly is a lens assembly including a peripheral rib.

8. The system according to claim 7, wherein the adhesive dispensing robot is configured to inject the adhesive into the peripheral trench after the peripheral rib is inserted into the peripheral trench.

9. A method for assembling a plurality of components into an assembly, comprising:
   assembling some of the plurality of components into a first subassembly in a cell, and assembling remaining ones of the second sub-assembly into a second subassembly in the cell when the some of the plurality of components are assembled into the first subassembly;
   attaching, by an assembling robot, the first sub-assembly to the second sub-assembly in the cell; and
   applying, by an adhesive dispensing robot, an adhesive between the first sub-assembly and the second sub-assembly in the cell, after the first sub-assembly is attached to the second sub-assembly, to bond the first sub-assembly to the second sub-assembly.

10. The method according to claim 9, further comprising assembling, by a first transfer robot, the some of the plurality of components into the first sub-assembly when the remaining ones of the plurality of components are assembled, by the second transfer robot, into the second sub-assembly in the cell.

11. The method according to claim 9, further comprising welding the remaining ones of the plurality of components into the second sub-assembly.

12. The method according to claim 9, further comprising inserting a rib of the second sub-assembly into a trench of the first sub-assembly.

13. The method according to claim 12, further comprising injecting the adhesive into the trench after the rib of the second sub-assembly is inserted into the trench of the first sub-assembly.

14. The method according to claim 9, further comprising assembling the remaining ones of the plurality of components into the second sub-assembly by sonic welding.

15. The method according to claim 9, further comprising sonically welding the first sub-assembly to the second sub-assembly by a welding robot.

16. The method according to claim 9, further comprising assembling the first sub-assembly by a first robot at a first tilting table and assembling the second sub-assembly at a second robot at a second titling table.

17. A method for assembling a plurality of components into an assembly, comprising:
   preparing a first sub-assembly and a second sub-assembly, wherein the first sub-assembly includes at least one of the plurality of components, and the second sub-assembly includes remaining ones of the plurality of components;
   transferring the first sub-assembly by a first transfer robot to an installation table and transferring the second sub-assembly by a second transfer robot to the installation table; attaching, by an assembling robot, the first sub-assembly to the second sub-assembly; and
   applying, by an adhesive dispensing robot, an adhesive between the first sub-assembly and the second sub-assembly, after the first sub-assembly is attached to the second sub-assembly, to bond the first sub-assembly to the second sub-assembly.

18. The method according to claim 17, further comprising attaching the first sub-assembly to the second sub-assembly on the installation table.

19. The method according to claim 17, wherein the adhesive is applied between the first sub-assembly and the second sub-assembly after the first sub-assembly and the second sub-assembly are transferred to the installation table.

* * * * *